Aug. 9, 1966  G. SNYDER  3,265,402
FOLDABLE GOLF CART
Filed Dec. 30, 1964  3 Sheets-Sheet 1
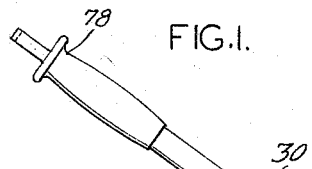
FIG.1.
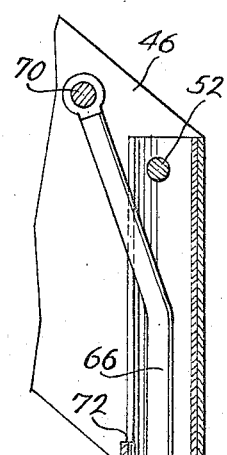
FIG.5.
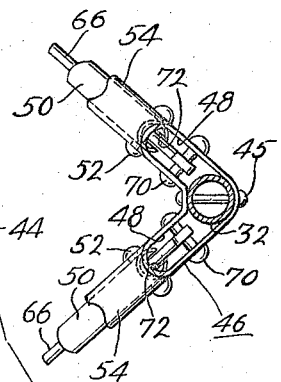
FIG.8.
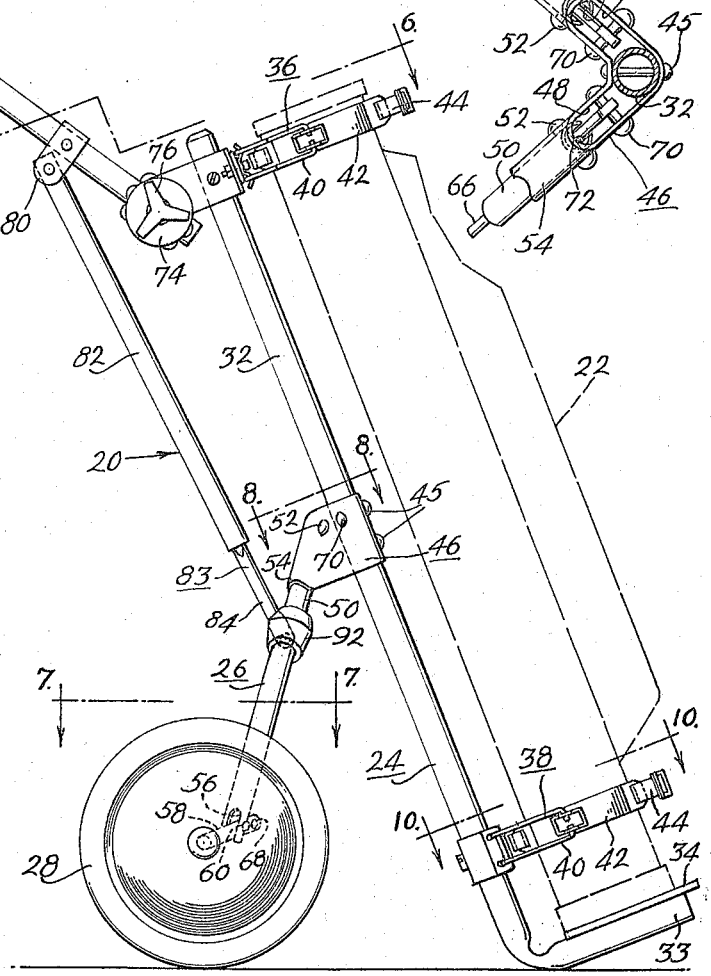
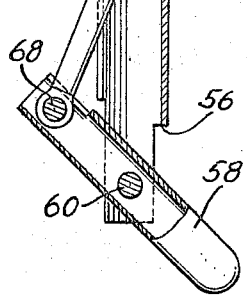
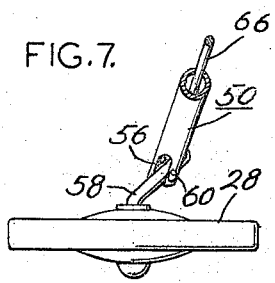
FIG.7.
INVENTOR:
GERSON SNYDER
BY Howson & Howson
ATTYS.

Aug. 9, 1966 G. SNYDER 3,265,402
FOLDABLE GOLF CART
Filed Dec. 30, 1964 3 Sheets-Sheet 2
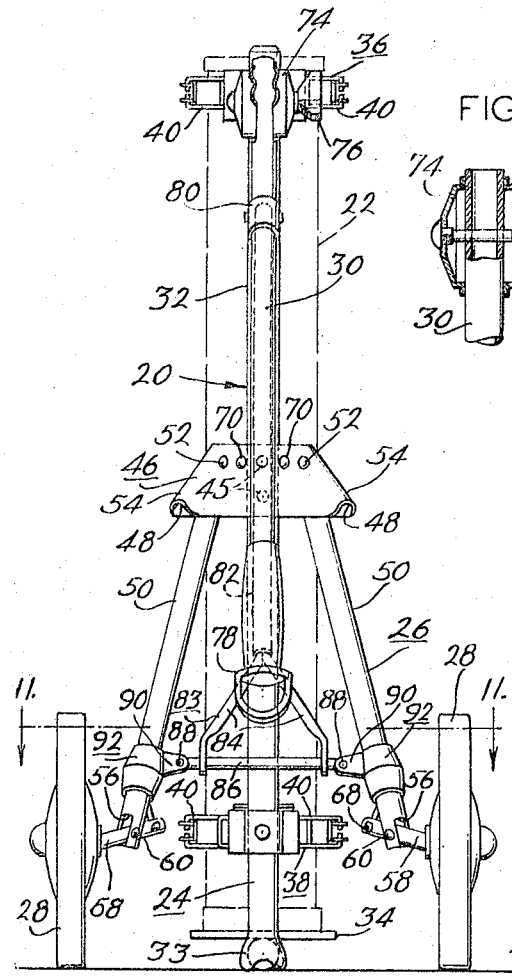
FIG.3
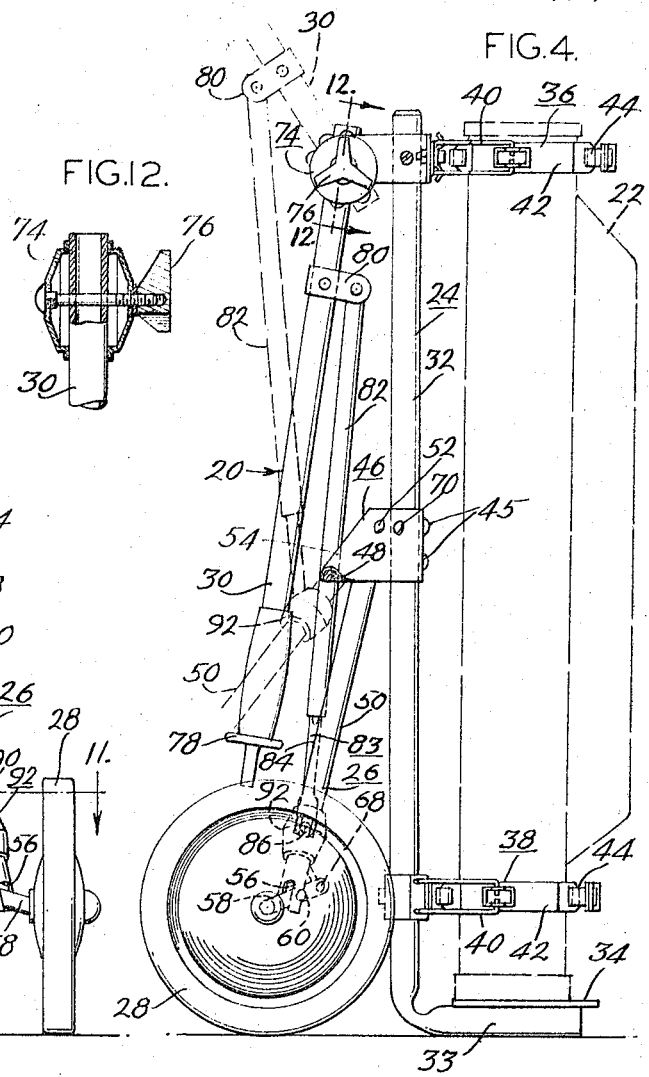
FIG.12.
FIG.4.
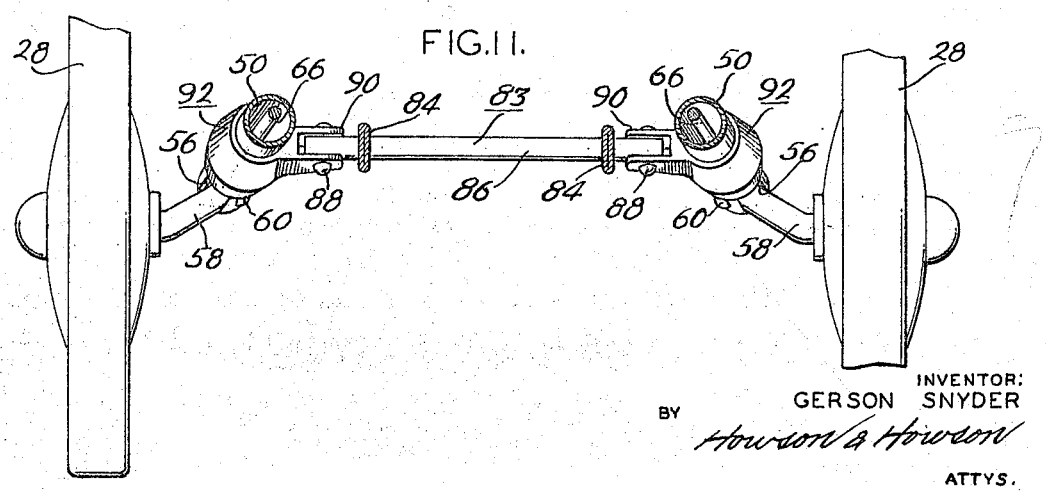
FIG.11.
INVENTOR:
GERSON SNYDER
BY Howson & Howson
ATTYS.

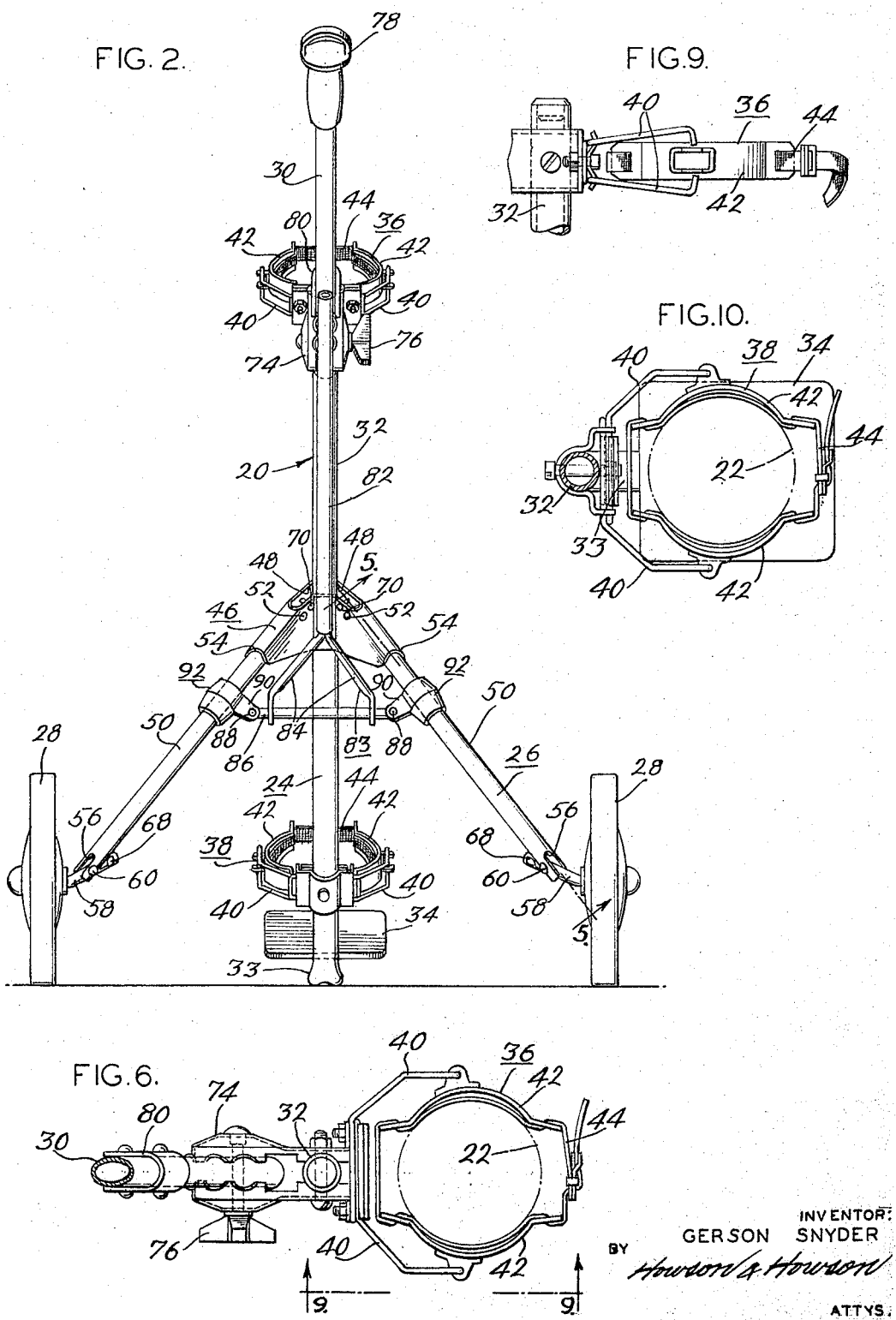

United States Patent Office 3,265,402
Patented August 9, 1966

3,265,402
FOLDABLE GOLF CART
Gerson Snyder, Philadelphia, Pa., assignor to Snyder Manufacturing Co., Philadelphia, Pa., a corporation of Pennsylvania
Filed Dec. 30, 1964, Ser. No. 422,337
7 Claims. (Cl. 280—41)

The present invention relates generally to golf carts of the two-wheeled foldable type commonly employed in place of a caddie for transporting a golf bag and clubs around a course, and relates more specifically to a simplified folding leg assembly for such a cart.

Golf carts of the type described are presently in widespread use, particularly at public golf courses where qualified caddies are often unavailable. The majority of these carts are of the folding type characterized by a structure which permits the wheels and supporting legs to be folded inwardly and the handle to be folded downwardly to form a compact unit for traveling or storage. Desirable features include a mechanism by means of which the wheels and legs are automatically folded inwardly upon pivoting of the handle to a position along the bag-supporting frame. In addition, means should be included for maintaining the wheels in parallel alignment in the folded position to save space as well as to permit the cart to be wheeled in the collapsed condition.

Carts which heretofore have provided the above advantages have been characterized by an elaborate and costly construction and consequently have been marketed at a relatively high retail price. It is a primary object of the present invention to provide a foldable golf cart of a novel simplified design which may be manufactured economically and sold at a relatively low price.

A further object of the invention is to provide a simplified, economical foldable golf cart, the wheels and legs of which fold automatically upon a downward pivoting of the cart handle.

Another object is to provide a foldable golf cart as described having means for maintaining the wheels in parallel relation in both the open and folded positions.

Additional objects and advantages of the invention will be more readily apparent from the following detailed description of an embodiment thereof when taken together with the accompanying drawings in which:

FIG. 1 is a side elevational view of a foldable golf cart constructed in accordance with the present invention as it appears in the open position;

FIG. 2 is a rear elevational view of the cart as shown in FIG. 1;

FIG. 3 is a rear elevational view of the cart as it appears in the folded or collapsed position;

FIG. 4 is a side elevational view of the cart as shown in FIG. 3;

FIG. 5 is a view taken along line 5—5 of FIG. 2 showing the relationship of the internal and external legs;

FIG. 6 is a view taken along line 6—6 of FIG. 1;

FIG. 7 is a view taken along line 7—7 of FIG. 1;

FIG. 8 is a view taken along line 8—8 of FIG. 1;

FIG. 9 is a view taken along line 9—9 of FIG. 6;

FIG. 10 is a view taken along line 10—10 of FIG. 1;

FIG. 11 is a view taken along line 11—11 of FIG. 3; and

FIG. 12 is a view taken along line 12—12 of FIG. 4.

Referring to the drawings, FIG. 1 shows a golf cart 20 embodying the present invention which is adapted for carrying a golf bag 22 (shown in broken lines) in a substantially upright position. The cart in brief comprises a bag-supporting frame assembly 24 which is supported by the foldable leg assembly 26 on which a pair of wheels 28 are mounted in spaced, parallel relation. The cart is maneuvered by means of a handle 30 secured to the upper end of the frame assembly.

Considering the construction in detail, the frame assembly 24 includes a tubular frame element 32, the lower end 33 of which is bent outwardly at right angles to accommodate a bag-supporting plate 34. Secured at upper and lower positions on the frame element 32 are bag-securing means 36 and 38, each of which includes, as shown in FIGS. 6, 9 and 10, brackets 40 extending from the frame element for the pivotal support of bag-holding members 42. Belts 44 passing through apertures in the members 42 provide adjustment to accommodate bags of various sizes and shapes.

Secured to the frame element 32 by rivets 45 is a leg-securing bracket 46 formed to provide rearwardly and outwardly directed slots 48 within which tubular external legs 50 are pivotally secured by rivets 52. The outer ends 54 of the bracket 46 are angled to form stops for the external legs 50 in the open position.

The lower end of each external leg 50 is slotted at 56 to receive an axle 58 which is pivotally secured by a rivet 60. A wheel 28 is journaled on the outer end of each axle 58, and is maintained in position thereon by conventional retaining means.

A pair of internal legs 66 pivotally connected at their lower ends to the inner end of each axle by rivets 68 and at their upper ends to the bracket 46 by means of rivets 70, pass inside the tubular external legs 50. As shown in FIG. 5, the upper and lower ends of the internal legs are inwardly directed, and the external legs are slotted at 72 and 73 to provide the necessary clearance. The pairs of rivets 52 and 70, and 60 and 68 are equally spaced and in parallel planes thus forming a parallelogram linkage which maintains the parallel relationship of the wheels at any position of the legs.

The handle 30 is secured by the multi-position locking clamp 74 to the upper end of the frame element 32. Upon release of the locking clamp wing nut 76, the handle may be pivoted in a vertical plane to the folded position shown in FIG. 4. A hand grip 78 is provided on the outer end of the handle.

A connecting arm 82 extends downwardly from a pivot clamp 80 on the handle and links the handle with a yoke assembly 83 adapted for controlling the position of the foldable leg assembly. The lower end of the connecting arm terminates in the fork arms 84 which, as shown in FIG. 2, are bored to receive the yoke arm 86. The ends of the yoke arm 86 are pivotally attached by rivets 88 to the forked extensions 90 of bushings 92 which are adapted to slide along the external legs 50. As can readily be understood, the folding leg assembly is controlled by movement of the handle for convenience in folding and unfolding the cart.

For normal use, the handle 30 is positioned as shown in FIG. 1 wherein the connecting arm 82 and yoke assembly 83 are in a raised position thus positioning the wheels in the widespread relation shown in FIG. 2. To collapse the cart, the wing nut 76 is loosened and the handle 30 is pivoted downwardly into the position shown in FIGS. 3 and 4, thus causing a downward movement of the connecting arm 82 and a resultant inward and forward folding of the legs due to the downward movement of the yoke assembly. It will be noted that the wheels remain parallel even in the folded position to permit a wheeling of the collapsed cart into or out of a storage area. As shown in FIG. 4, the wheels upon collapse move forwardly into close relationship with the frame assembly 24 to form a compact package. Raising of the handle to the position shown in FIG. 1 automatically unfolds the legs to prepare the cart for normal duty. For folding or unfolding the legs, the cart is preferably tilted forward and balanced on the lower end 33 of the frame element 32 so that the wheels clear the ground during the transition period.

Manifestly, changes in details of construction can be effected by those skilled in the art without departing from the spirit and the scope of the invention as defined in and limited solely by the appended claims.

I claim:

1. A golf cart comprising a bag-supporting frame, and a foldable leg assembly extending from said frame, said leg assembly comprising a pair of hollow external legs pivotally attached at their upper ends to said frame, an axle pivotally secured to the lower end of each said external leg, a wheel journaled on each said axle, an internal leg disposed within each said external leg, means at the upper and lower ends of each said internal leg for pivotally connecting said internal leg respectively with said frame and one said axle to form a parallelogram linkage with the corresponding external leg, and means for controlling the position of said foldable leg assembly, said wheels being maintained in a constant parallel relation by said parallelogram linkages at any position of said leg assembly.

2. A golf cart comprising a bag-supporting frame, and a foldable leg assembly extending from said frame, said leg assembly comprising a pair of hollow external legs pivotally attached at their upper ends to said frame, an axle pivotally secured to the lower end of each said external leg, a wheel journaled on each said axle, an internal leg disposed within each said external leg, means at the upper and lower ends of each said internal leg for pivotally connecting the leg respectively with said frame and one said axle to form a parallelogram linkage with the corresponding external leg, a yoke assembly slidably engaging said external legs for controlling the position of said foldable leg assembly, and means for actuating said yoke assembly along said external legs, said wheels being maintained in a constant parallel relation by said parallelogram linkages at any position of said leg assembly.

3. A golf cart comprising a bag-supporting frame, and a foldable leg assembly extending from said frame, said leg assembly comprising a pair of hollow external legs pivotally attached at their upper ends to said frame, an axle pivotally secured to the lower end of each said external leg, a wheel journaled on each said axle, an internal leg disposed within each said external leg, the upper and lower ends of each said internal leg being offset from and passing through slots in the ends of the corresponding external leg for pivotal connection respectively with said frame and one said axle to form a parallelogram linkage with the corresponding external leg, and means for controlling the position of said foldable leg assembly, said wheels being maintained in a constant parallel relation by said parallelogram linkages at any position of said leg assembly.

4. A golf cart comprising a bag-supporting frame, a handle pivotally secured to said frame, a foldable leg assembly extending from said frame, said leg assembly comprising a pair of hollow external legs pivotally attached at their upper ends to said frame, an axle pivotally secured to the lower end of each said external leg, a wheel journaled on each said axle, an internal leg disposed within each said external leg, means at the upper and lower ends of each said internal leg for pivotally connecting the leg respectively with said frame and one said axle to form a parallelogram linkage with the corresponding external leg, and means operable by pivoting said handle for controlling the position of said foldable leg assembly, said wheels being maintained in a constant parallel relation by said parallelogram linkage at any position of said leg assembly.

5. A golf cart comprising a bag-supporting frame, a handle pivotally secured to said frame, a foldable leg assembly extending from said frame, said leg assembly comprising a pair of hollow external legs pivotally attached at their upper ends to said frame, an axle pivotally secured to the lower end of each said external leg, a wheel journaled on each said axle, an internal leg disposed within each said external leg, means at the upper and lower ends of each said internal leg for pivotally connecting the leg respectively with said frame and one said axle to form a parallelogram linkage with the corresponding external leg, and means operable by pivoting said handle for controlling the position of said foldable leg assembly, said latter means comprising a yoke assembly slidably engaging said external legs, and actuating means connecting said yoke assembly with said handle, said wheels being maintained in a constant parallel relation by said parallelogram linkage at any position of said leg assembly.

6. A golf cart comprising a bag-supporting frame, a handle pivotally connected to said frame, a foldable leg assembly extending from said frame, said leg assembly comprising a pair of hollow external legs pivotally attached at the upper ends to said frame, an axle pivotally secured to the lower end of each said external leg, a wheel journaled on each said axle, an internal leg disposed within each said external leg, means at the upper and lower ends of each said internal leg for pivotally connecting the leg respectively with the frame and one said axle to form a parallelogram linkage with the corresponding external leg, a yoke assembly slidably engaging said external legs for controlling the position thereof, said yoke assembly including a bushing slidably engaging each said external leg, and a yoke arm extending between and pivotally connected to said bushings, and a connecting arm extending between said handle and said yoke assembly whereby the positioning of said foldable leg assembly is effected by pivoting of said handle, said wheels being maintained in a constant parallel relation by said parallelogram linkage at any position of said leg assembly.

7. A golf cart comprising a bag-supporting frame, a handle pivotally connected to said frame, and a foldable leg assembly extending from said frame, said leg assembly comprising a pair of hollow external legs pivotally attached at their upper ends to said frame, an axle pivotally secured to the lower end of each said external leg, a wheel journaled on each said axle, an internal leg disposed within each said external leg, the upper and lower ends of each said internal leg being offset from and passing through the slots in the ends of the corresponding external leg for pivotal connection respectively with said frame and one said axle to form a parallelogram linkage with the corresponding external leg, a yoke assembly slidably engaging said external legs for controlling the position thereof, said yoke assembly including a bushing slidably engaging each said external leg, and a yoke arm extending between and pivotally connected to said bushings, and a connecting arm extending between said handle and said yoke assembly whereby the positioning of said foldable leg assembly is effected by pivoting of said handle, said wheel being maintained in a constant parallel relation by said parallelogram linkage in any position of said leg assembly References Cited by the Examiner
UNITED STATES PATENTS
3,167,146   1/1965   Rudolph.

BENJAMIN HERSH, Primary Examiner.

M. S. SALES, Assistant Examiner.